US011272099B2

(12) United States Patent
Tanaka (10) Patent No.: US 11,272,099 B2
(45) Date of Patent: Mar. 8, 2022

(54) IMAGE CAPTURING APPARATUS, METHOD OF CONTROLLING THE SAME, AND STORAGE MEDIUM

(71) Applicant: CANON KABUSHIKI KAISHA, Tokyo (JP)

(72) Inventor: Yuki Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/222,729

(22) Filed: Apr. 5, 2021

(65) Prior Publication Data

US 2021/0321037 A1  Oct. 14, 2021

(30) Foreign Application Priority Data

Apr. 9, 2020 (JP) .............................. JP2020-070562

(51) Int. Cl.
*H04N 5/232* (2006.01)
*G06T 7/246* (2017.01)

(52) U.S. Cl.
CPC ..... *H04N 5/23229* (2013.01); *H04N 5/23245* (2013.01); *H04N 5/23296* (2013.01); *G06T 7/246* (2017.01); *G06T 7/248* (2017.01)

(58) Field of Classification Search
CPC ........... H04N 5/23229; H04N 5/23245; H04N 5/23296; G06T 7/246; G06T 7/248; G06T 3/403; G06T 3/4053; G06T 2207/20081
See application file for complete search history.

(56) References Cited

U.S. PATENT DOCUMENTS

| 9,197,885 | B2 * | 11/2015 | Sun | ...................... G06K 9/6201 |
| 10,382,712 | B1 * | 8/2019 | Forutanpour | ...... H04N 5/23229 |
| 2018/0101645 | A1 * | 4/2018 | Sorenson | .................. G06T 7/13 |
| 2019/0286936 | A1 * | 9/2019 | Fuchs | .................... G16H 30/40 |
| 2019/0387168 | A1 * | 12/2019 | Smith | ..................... G06T 7/248 |
| 2020/0372608 | A1 * | 11/2020 | Lee | ........................... G06T 7/13 |
| 2021/0056667 | A1 * | 2/2021 | Rawat | ................ G06K 9/00281 |

FOREIGN PATENT DOCUMENTS

JP      6441980 B2    12/2018
JP    2019-075130 A    5/2019

* cited by examiner

*Primary Examiner* — Hung H Lam
(74) *Attorney, Agent, or Firm* — Canon U.S.A., Inc. I.P. Division (57) ABSTRACT

An image capturing apparatus is provided, which includes a first image capturing device that captures first continuous images that are continuous time-serially; a second image capturing device that captures second continuous images that are continuous time-serially under a shooting setting different from a shooting setting of the first image capturing device; a calculation unit that calculates evaluation values respectively for the second continuous images; an image processing unit that applies image processing to an image which is included among the second continuous images and which has the evaluation value equal to or larger than a threshold, and a generation unit that generates supervisory data for machine learning with use of an image to which at least the image processing has been applied.

10 Claims, 7 Drawing Sheets

IMAGE CAPTURING APPARATUS, METHOD OF CONTROLLING THE SAME, AND STORAGE MEDIUM

BACKGROUND

Field

The present disclosure relates to a technique to efficiently generate supervisory data used in machine learning with use of obtained time-series image data.

Description of the Related Art

In recent years, due to, for example, advances in deep learning techniques, techniques to recognize objects in images through machine learning have developed more actively. For example, for digital cameras, these techniques are applied in order to detect a subject from images obtained through live-view shooting and track the subject while automatically focusing on the subject (AF).

Machine learning is divided into learning and inference phases, and performs inference based on dictionary data obtained through learning. In the learning phase, as the amount of computation and the memory capacity required are large, dictionary data is usually generated by performing learning on, for example, a server equipped with dedicated hardware, rather than on an edge device, such as a digital camera. An edge device performs inference with use of this dictionary data. The amount of computation and the memory capacity for inference are smaller than the amount of computation and the memory capacity for learning, and dedicated hardware for performing inference on an edge device has been developed.

However, in recent years, as dedicated hardware for learning has further developed, and high-speed communication environments, such as the fifth-generation mobile communication system (5G), have developed, dedicated hardware for learning has been prepared for an edge device as well. This, in terms of computation capability, is leading to the establishment of an environment in which images obtained by a camera of an edge device can be learned on the device itself, or on a cloud connected thereto.

A digital camera as an edge device with a learning capability could, for example, be expected to learn a subject in images that have been repeatedly shot by a user, and to become capable of recognizing the subject during live-view shooting by use of the results of learning.

However, learning for performing object recognition through machine learning requires a large number of images tagged with ground truth labels. A pair of a ground truth label and an image is referred to as supervisory data. In such object recognition, labeling is expected to be performed by designating the position of a target object inside an image as a rectangle. In performing machine learning, approximately several tens of thousands of pieces of supervisory data are required, and collecting such a large number of images to be tagged with ground truth labels can be challenging.

In view of the foregoing situation, Japanese Patent Laid-Open No. 2019-75130 discloses a technique to efficiently generate supervisory data used in machine learning with use of time-series image data. In this technique, provided that there is an already-labeled image in time-series images, a subject position in the next image is extracted and the next image is labeled; in this way, learning can be performed efficiently with respect to time-series images. This enables efficient labeling also with respect to images obtained through live-view shooting, and facilitates learning that uses live-view images.

Furthermore, Japanese Patent No. 6441980 discloses a technique to increase supervisory data by performing the following image processing with respect to original supervisory data: application of inversion, tone modification, enlargement/reduction, translation, deformation by distortion, composition with another image, and so forth, to supervisory data having patterns that are scarce. With use of this technique, the number of shot images that are necessary for learning can be reduced.

When a subject is detected from images obtained through live-view shooting, it is generally the case that such shooting environment factors as the distance to the subject and the brightness change each time shooting is performed. Therefore, also in machine learning that uses images obtained through live-view shooting, it is effective to increase supervisory data by using image processing for adding shaking or blur, adjusting luminance, and so forth with respect to data that has insufficient blur and brightness due to changes in shooting environments. In this way, highly robust dictionary data can be generated from a small number of shot images by supplementing shooting environments that fluctuate during live-view shooting by way of an increase in supervisory data through image processing.

However, when machine learning is performed using images obtained through live-view shooting, the appearance of resolution may be lost due to blurring of a subject caused by a motion of the subject or a camera, and gradation information may be lost due to blocked-up shadows and blown-out highlights caused by inappropriate exposure settings for the subject. Therefore, if supervisory data is increased by applying the technique of Japanese Patent No. 6441980 to images obtained through live-view shooting, it can result in situations where image processing is applied to images with the appearance of low resolution, and low-quality supervisory data can be generated.

SUMMARY

Various embodiments of the present disclosure provide an image capturing apparatus that can generate high-quality learning images where learning is performed using images during live view.

According to a first embodiment of the present disclosure, there is provided an image capturing apparatus, including: a first image capturing device that captures first continuous images that are continuous time-serially; a second image capturing device that captures second continuous images that are continuous time-serially under a shooting setting different from a shooting setting of the first image capturing device; and at least one processor or circuit configured to function as: a calculation unit that calculates evaluation values respectively for the second continuous images, an image processing unit that applies image processing to an image which is included among the second continuous images and which has the evaluation value equal to or larger than a threshold, and a generation unit that generates supervisory data for machine learning with use of an image to which at least the image processing has been applied.

According to a second embodiment of the present disclosure, there is provided a method of controlling an image capturing apparatus comprising: executing first image capture that captures first continuous images that are continuous time-serially; executing second image capture that captures second continuous images that are continuous time-serially under a shooting setting different from a shooting setting of the first image capture; calculating evaluation values respectively for the second continuous images; applying image processing to an image which is included among the second continuous images and which has the evaluation value equal to or larger than a threshold; and generating supervisory data for machine learning with use of an image to which at least the image processing has been applied.

Further features of the present disclosure will become apparent from the following description of exemplary embodiments with reference to the attached drawings.

DESCRIPTION OF THE EMBODIMENTS

Hereinafter, various embodiments will be described in detail with reference to the attached drawings. Note, the following example embodiments are not intended to limit the scope of the claimed invention. Multiple features are described in the embodiments, but limitation is not made to an invention that requires all such features, and multiple such features may be combined as appropriate in different embodiments. Furthermore, in the attached drawings, the same reference numerals are given to the same or similar configurations, and redundant description thereof is omitted.

Figure 1:
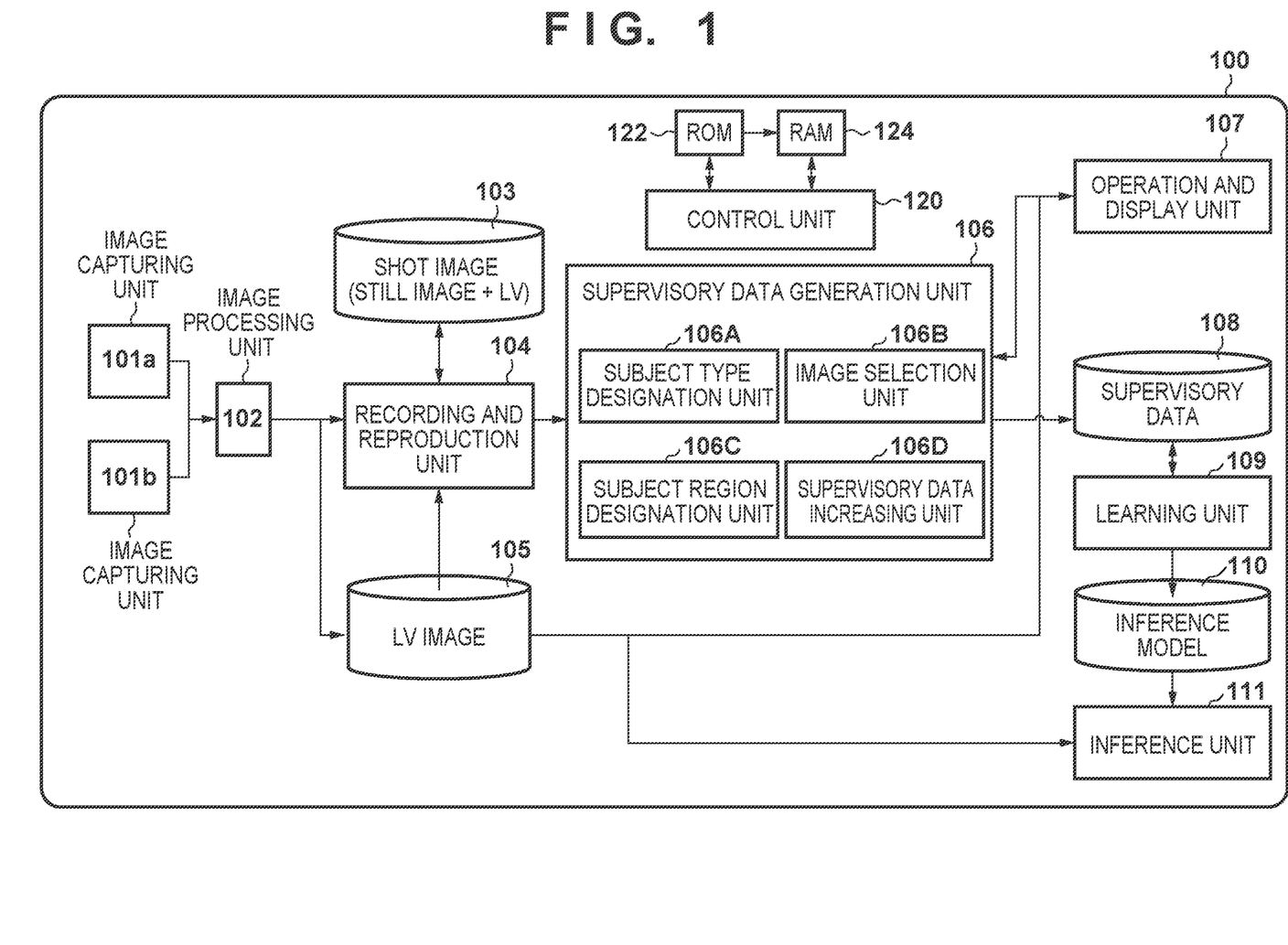
FIG. 1 is a block diagram showing a configuration of an image capturing apparatus according to one embodiment.

FIG. 1 is a block diagram showing a configuration of an image capturing apparatus 100 according to one embodiment of the present disclosure.

The image capturing apparatus 100 includes a plurality of image capturing units, and has a live-view (hereinafter also referred to as LV) shooting function. Live-view shooting is a method in which continuous images are obtained by repeatedly performing a shooting operation at a predetermined interval, a shooting target is displayed in real time, and a still image is shot with a composition and shooting settings that were determined while viewing the shooting target. Images obtained through live view are denoted as LV images. The image capturing apparatus 100 performs live-view shooting with use of one or more image capturing units included among the plurality of image capturing units. The image capturing apparatus 100 also has learning and inference functions for detecting a subject from still images and LV images that have been shot.

The image capturing apparatus 100 is configured to include image capturing units 101a, 101b, an image processing unit 102, a shot image (still images and LV images) storage unit 103, a recording and reproduction unit 104, an LV image storage unit 105, a supervisory data generation unit 106, an operation and display unit 107, a supervisory data storage unit 108, a learning unit 109, an inference model storage unit 110, and an inference unit 111.

The image capturing units 101a, 101b include an optical system and an image sensor (not shown), shoot a subject image incident via the optical system, and performs photoelectric conversion. The present embodiment will be described based on a configuration in which images shot by the image capturing unit 101a are used for display and generation of supervisory data, whereas images shot by the image capturing unit 101b are used only for generation of supervisory data. The image processing unit 102 applies appropriate image processing to video data obtained by the image capturing units 101a, 101b.

The shot image storage unit 103 is a nonvolatile memory for recording and reproducing still images and LV images. The recording and reproduction unit 104 controls recording and reproduction of still images and LV images in connection with the shot image storage unit 103. The LV image storage unit 105 temporarily stores display images for outputting LV images to the operation and display unit 107 during live-view shooting. The supervisory data generation unit 106 generates supervisory data for machine learning for detecting a subject, and is configured to include a subject type designation unit 106A, an image selection unit 106B, a subject region designation unit 106C, and a supervisory data increasing unit 106D.

The operation and display unit 107 is a touchscreen-equipped display apparatus (not shown), displays LV images and user interfaces (hereinafter UIs) at the time of shooting, and accepts user operations.

The supervisory data storage unit 108 stores supervisory data generated by the supervisory data generation unit 106, and feeds the supervisory data to the learning unit 109. The learning unit 109 performs learning based on the supervisory data, and generates an inference model. The inference model storage unit 110 stores the inference model. The inference unit 111 detects (infers) a subject from LV images based on the inference model.

In the present embodiment, among still images and LV images, images that are used particularly in learning for subject detection are referred to as learning images.

Note that the image capturing apparatus 100 includes a control unit 120 composed of a microcomputer that controls the entire image capturing apparatus. The control unit 120 controls the entirety of the image capturing apparatus 100 by deploying a control program, which is stored in a ROM 122 and controls the operations of the image capturing apparatus, to a RAM 124 and executing the control program.

(Shooting Function)

The shooting function of the image capturing apparatus 100 is now described. When a user has set a shooting mode with use of the operation and display unit 107, a live-view operation is started.

At the time of the live-view operation, LV images captured by the image capturing unit 101a undergo appropriate image processing in the image processing unit 102, and are then displayed as a live-view video on the display apparatus of the operation and display unit 107 via the LV image storage unit 105. As LV images shot by the image capturing unit 101*a* (hereinafter referred to as first LV images) are displayed as a live-view video, they are shot in accordance with user settings, or under shooting settings that suit a scene in the case of auto settings.

The image capturing unit 101*b* performs shooting under shooting settings that differ from shooting settings of the image capturing unit 101*a*. LV images shot by the image capturing unit 101*b* (hereinafter referred to as second LV images) are shot under one of the four shooting settings described below, or by changing the plurality of settings, so that their image quality is improved compared to the first LV images. The first one is a setting with a deep depth of field so as to reduce blur. The second one is a setting with a high shutter speed so as to reduce shaking. The third one is a setting with a different exposure setting so as to reduce blown-out highlights and blocked-up shadows. The fourth one is a setting with a wide-angle shooting range.

The second LV images that have been shot by the image capturing unit 101*b* with a change in at least one of these shooting settings undergo appropriate image processing in the image processing unit 102, and are then recorded to the LV image storage unit 105, similarly to the first LV images. The LV image storage unit 105 temporarily stores a predetermined number of newest first LV images and second LV images shot by the image capturing units 101*a*, 101*b*.

Once the user has determined a composition and shooting settings while viewing a live-view video and designated shooting of a still image, later-described processing is performed.

The still image captured by the image capturing unit 101*a* undergoes appropriate image processing in the image processing unit 102, and is then stored to the shot image storage unit 103 via the recording and reproduction unit 104. Furthermore, the newest first and second LV images that are temporarily stored in the LV image storage unit 105 are stored in association with the still image to be used as learning images. This associated data set is referred to as a "still image with LV images".

Figure 2:
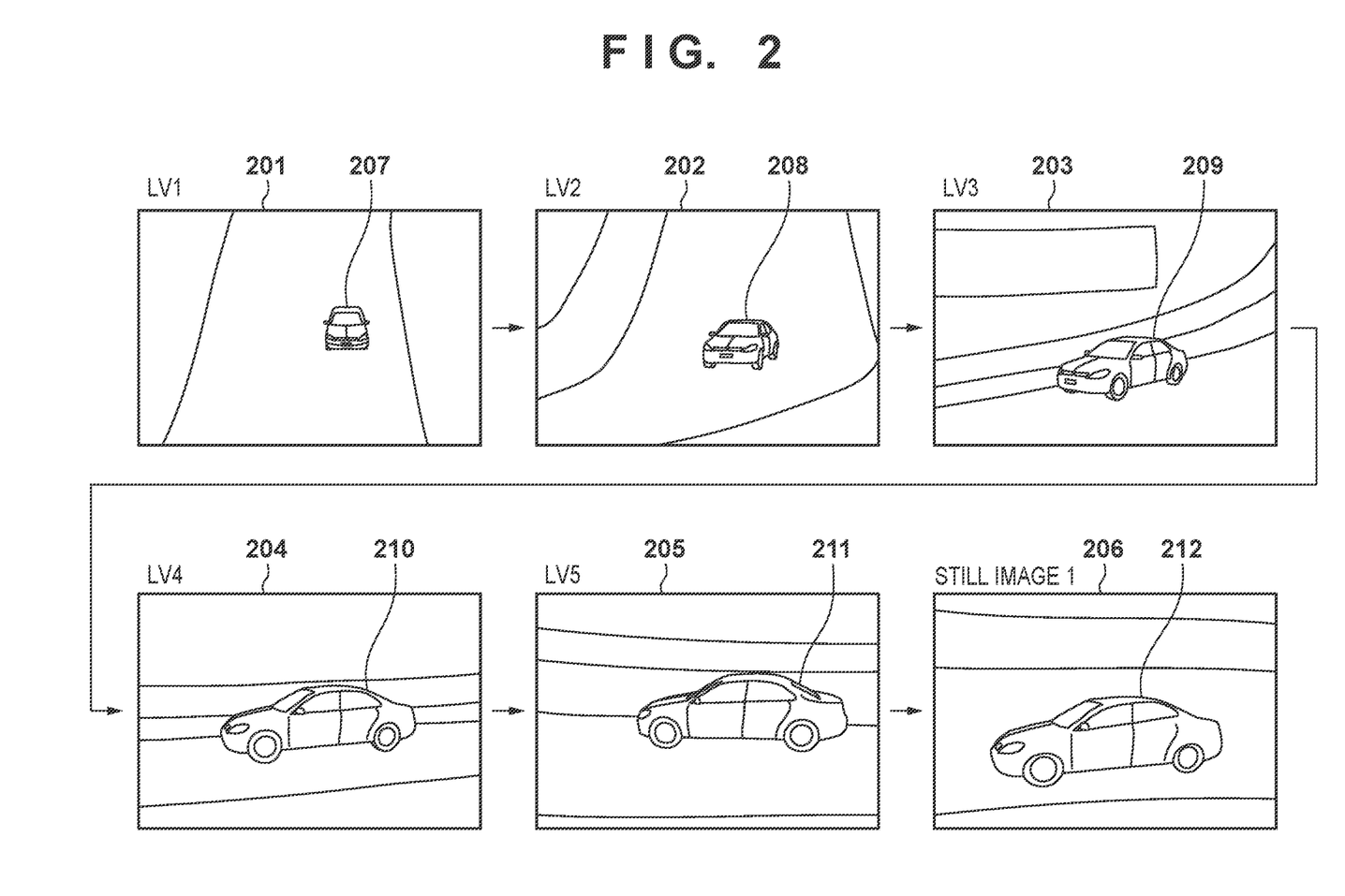
FIG. 2 is a diagram showing how the appearance of a subject changes until a still image is shot in live-view shooting according to one embodiment.
Figure 3:
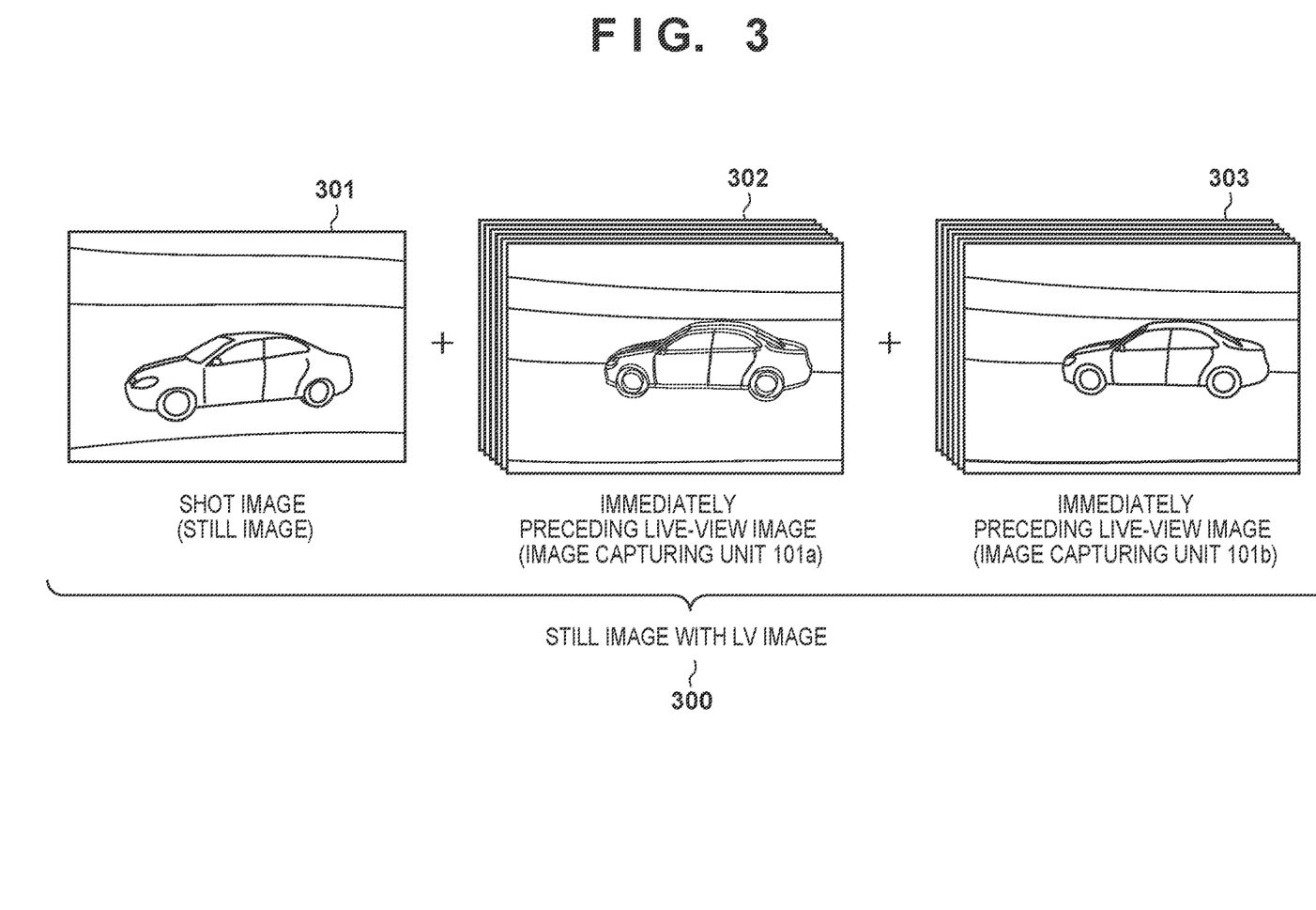
FIG. 3 is a diagram showing an example of a still image with LV images according to one embodiment.

FIG. 2 shows an example in which the user has tracked an automobile, which is a subject, while viewing LV images 201 to 205, and shot a still image 206. According to the shooting example of FIG. 2, a still image 300 with LV images is composed of a still image 301 and immediately preceding first LV images 302 and second LV images 303 as shown in FIG. 3. The still image with LV images has both the role of data of a recorded still image shot by the user, and the role of an image for learning for subject detection.

Note that when shot images show no motion, first and second LV images do not serve as additional supervisory data even if they are used as images for learning. Furthermore, when there is a small difference between frames of LV images (between neighboring images), it is not efficient to use all LV images for learning. Therefore, it is also possible to further provide an inter-image difference detection unit (not shown), and prevent relevant images from being temporarily stored when the difference between LV images falls below a predetermined value.

The present embodiment has been described using a case where two image capturing units are provided; however, in a case where three or more image capturing units are provided, three or more types of LV images can also be obtained by changing shooting settings. Furthermore, it is permissible to adopt a configuration in which one image capturing unit obtains a plurality of LV images by shooting an LV image while changing shooting settings with use of time division.

(About Learning)

Next, the function of the image capturing apparatus 100 to generate supervisory data and learn will be described. This function is a function in which, when the user has designated a subject shown in still images that have been shot and stored and in associated LV images, learning is performed so that this subject can be detected at the time of live-view shooting.

Figure 4:
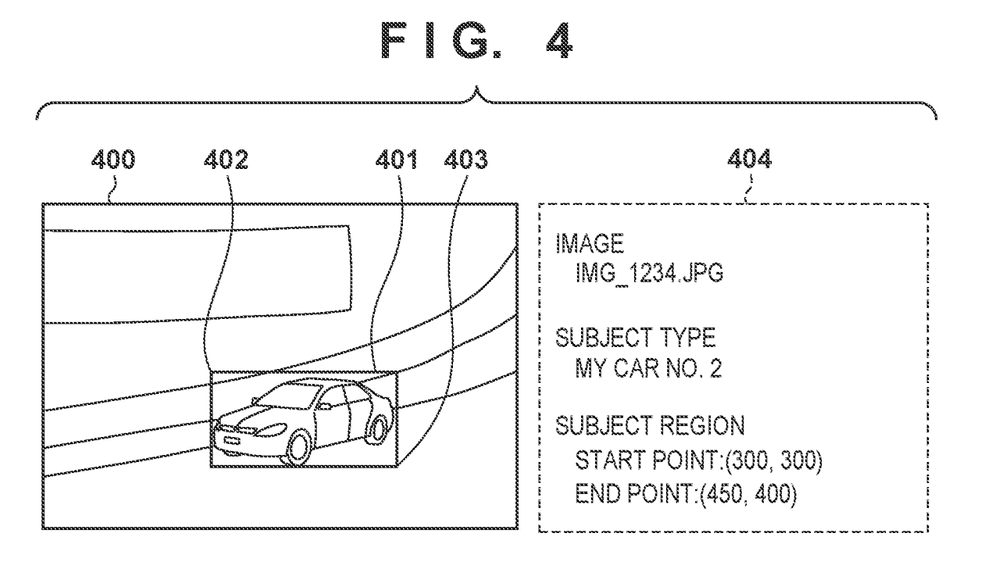
FIG. 4 is a diagram showing a concept of supervisory data for learning according to one embodiment.

In the present embodiment, supervisory data for learning of subject detection is a set of an image for learning, a subject type, and position information of a subject inside this image. This concept will be described using FIG. 4. In this example, supervisory data is composed of an image 400, a subject type, and information of a rectangular region 401 that contains and exactly fits a subject (automobile) to be learned in this image. As indicated by reference sign 404, a data format includes an image file name, a subject type name, and coordinate values of two points 402, 403 that represent the opposing corners of the rectangular region 401.

The supervisory data is obtained by designating a subject type and a subject region inside still images and LV images based on a user instruction. The obtained supervisory data is stored to the supervisory data storage unit 108, and the learning unit 109 performs learning with reference to this supervisory data.

Specifically, the subject type designation unit 106A designates a type of a subject to be learned, the image selection unit 106B selects a still image to be learned from among still images with LV images, and the subject region designation unit 106C designates a subject region inside the selected still image. As a result, the supervisory data is obtained.

The subject type designation unit 106A performs control to accept a subject type from the user via the operation and display unit 107.

Figure 5:
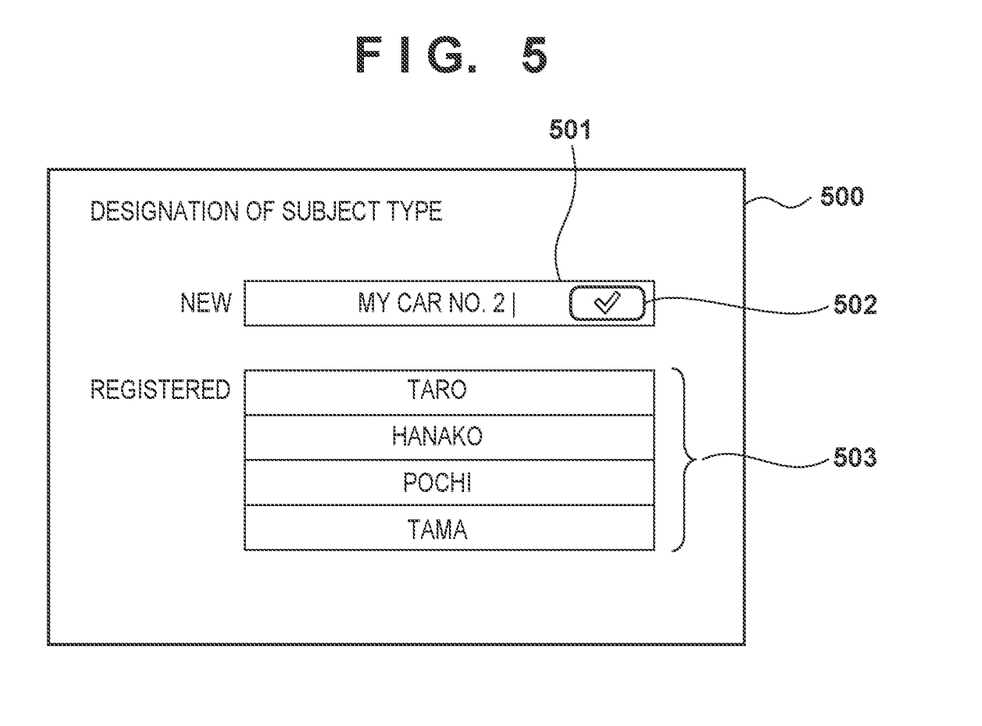
FIG. 5 is a diagram showing an exemplary display at the time of designation of a subject type to be learned according to one embodiment.

FIG. 5 shows an exemplary display on the operation and display unit 107. In order to newly add a car as a subject, a subject type is input and a confirmation button 502 is tapped for confirmation, as indicated by reference sign 501. In the case of a subject type that has already been registered, selection is made from a registered list 503.

Figure 6:
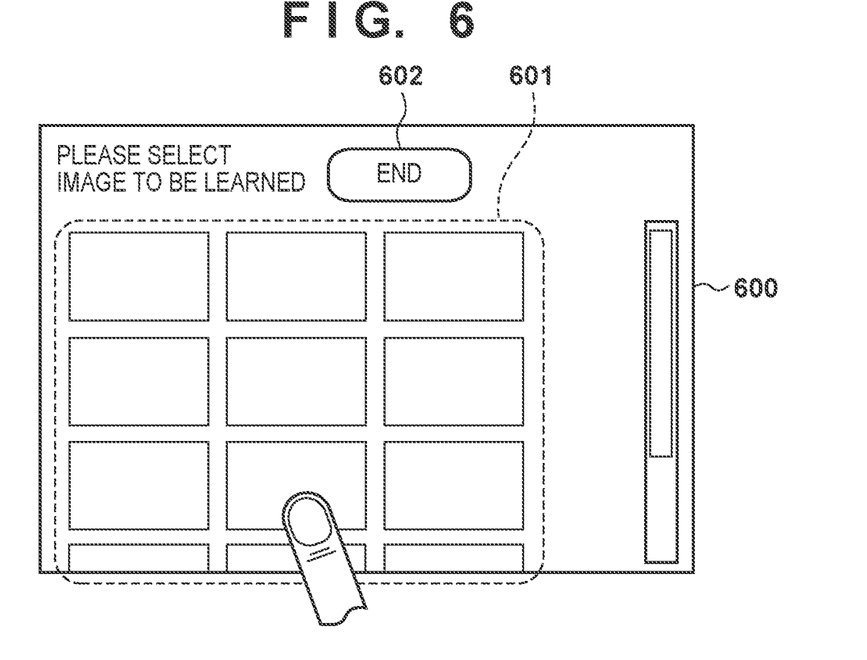
FIG. 6 is a diagram showing an exemplary display at the time of selection of an image to be learned according to one embodiment.

The image selection unit 106B performs control to select an image to be learned. Still images with LV images in the shot image storage unit 103 are read out via the recording and reproduction unit 104, and a list thereof is displayed on the operation and display unit 107. FIG. 6 shows an exemplary display. A list of images is displayed as thumbnails in a region 601 inside a display frame 600, and a still image is selected by the user tapping a desired image.

The subject region designation unit 106C performs control to obtain, from the user, position information of a subject in relation to the selected still image and associated LV images.

Figure 7:
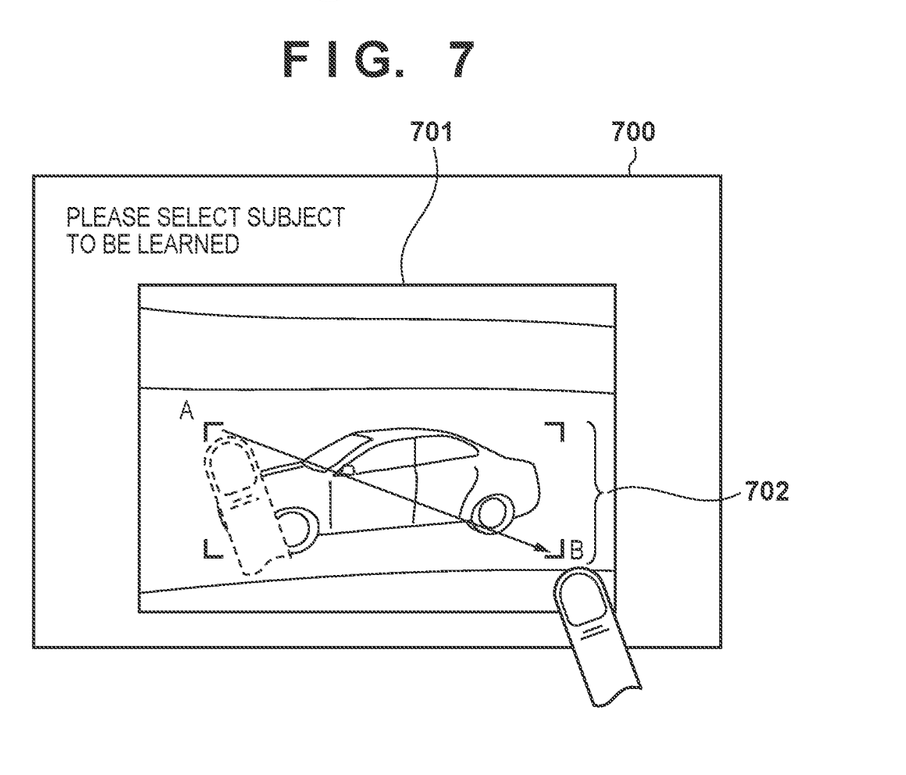
FIG. 7 is a diagram showing an exemplary operation of designating a region of a subject to be learned according to one embodiment.

FIG. 7 shows an exemplary display on the operation and display unit 107. In this example, in order for an automobile to be learned, a rectangle 702, which has points A, B that contain and exactly fit the region of the automobile as opposing corners, is designated by performing a drag from a position A to a position B on the touchscreen. A set of an image, a subject type, and rectangle information indicating a subject region that have been selected in the foregoing manner is used as supervisory data. With respect to associated first and second LV images as well, rectangle information indicating a subject region is designated to generate supervisory data, similarly to still images. Furthermore, when a subject is not present inside an LV image or hidden behind another subject, designation of rectangle information can be skipped.

Note, although the user designates a rectangular region of a subject on his/her own in the present embodiment, no limitation is intended by this; it is permissible to adopt a configuration in which, for example, a subject region is extracted using a known outline extraction technique in response to tapping of a part of a subject by the user.

Furthermore, although supervisory data is generated with respect to every LV image associated with a still image, it is permissible to adopt a configuration in which an inter-image difference detection unit (not shown) is provided, and LV images are thinned out by skipping images in which the difference between LV images falls below a predetermined amount. Supervisory data can be thinned out in this manner when still images with LV images are recorded at the time of shooting, or when supervisory data is generated from still images with LV images at the time of learning.

The supervisory data increasing unit 106D augments supervisory data (data augmentation) with respect to an LV image for which the user has designated a rectangular region, that is to say, generates new supervisory data with use of image processing. Processing for generating the new supervisory data will be described using FIG. 8. The present processing is executed repeatedly each time the user has designated a rectangular region with respect to an LV image. Note, it is assumed that the subject type designation unit 106A, the image selection unit 106B, the subject region designation unit 106C, and the supervisory data increasing unit 106D, which are constituent elements of the supervisory data generation unit 106 in the present embodiment, are realized by the microcomputer composing the control unit 120. That is to say, as processing performed by the supervisory data increasing unit 106D in the following processing is executed by the microcomputer of the control unit 120, the control unit 120 will be described as a main executor of the operations below.

Figure 8:
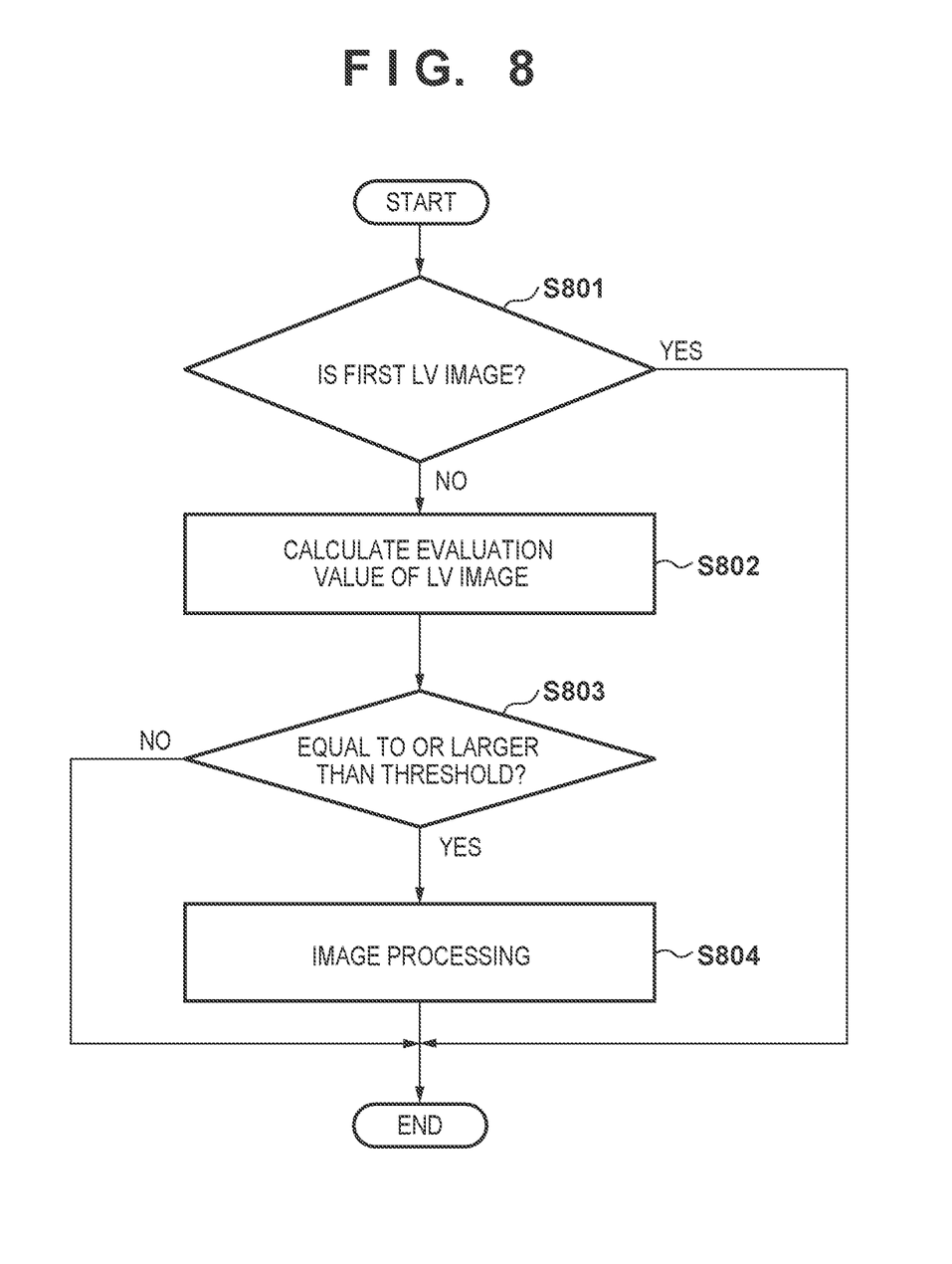
FIG. 8 is a flowchart illustrating a flow of processing for generating new supervisory data according to one embodiment.

In step S801, the control unit 120 obtains supervisory data for an LV image, and judges whether the LV image is a first LV image or a second LV image. When the control unit 120 judges that the LV image is a first LV image, it ends processing of this flow, and proceeds to processing for designation of a rectangular region with respect to the next LV image. When the control unit 120 determines that the LV image is a second LV image, processing proceeds to step S802.

In step S802, in order to judge whether the LV image is an image appropriate for the generation of new supervisory data, which will be described later, the control unit 120 obtains an evaluation value related to the appearance of resolution and gradation with respect to a subject region in the LV image. The image appropriate for the generation of new supervisory data denotes an image in which a large amount of information of the appearance of resolution, gradation, and the like is left in the subject region inside the image. The appearance of resolution can be attained using a known technique, for example, calculation of high-frequency components through the Fourier transform, or the execution of edge detection with use of filter processing. The gradation, too, can be attained using a known technique, for example, calculation that uses a histogram.

In step S803, the control unit 120 judges whether the evaluation value calculated in step S802 is larger than or equal to a predetermined threshold. When the control unit 120 determines that the appearance of resolution is high to the point where the evaluation value is equal to or larger than the predetermined threshold and that the gradation is appropriate, that is to say, the image does not include blocked-up shadows and blown-out highlights, processing proceeds to step S804. When it is determined that the image has the appearance of low resolution or does not have appropriate gradation, processing of this flow is ended, thereby proceeding to processing for designation of a rectangular region with respect to the next LV image.

In step S804, the control unit 120 generates new supervisory data by performing image processing with respect to the LV image with the evaluation value that was judged to be equal to or larger than the threshold in step S803.

Figure 9:
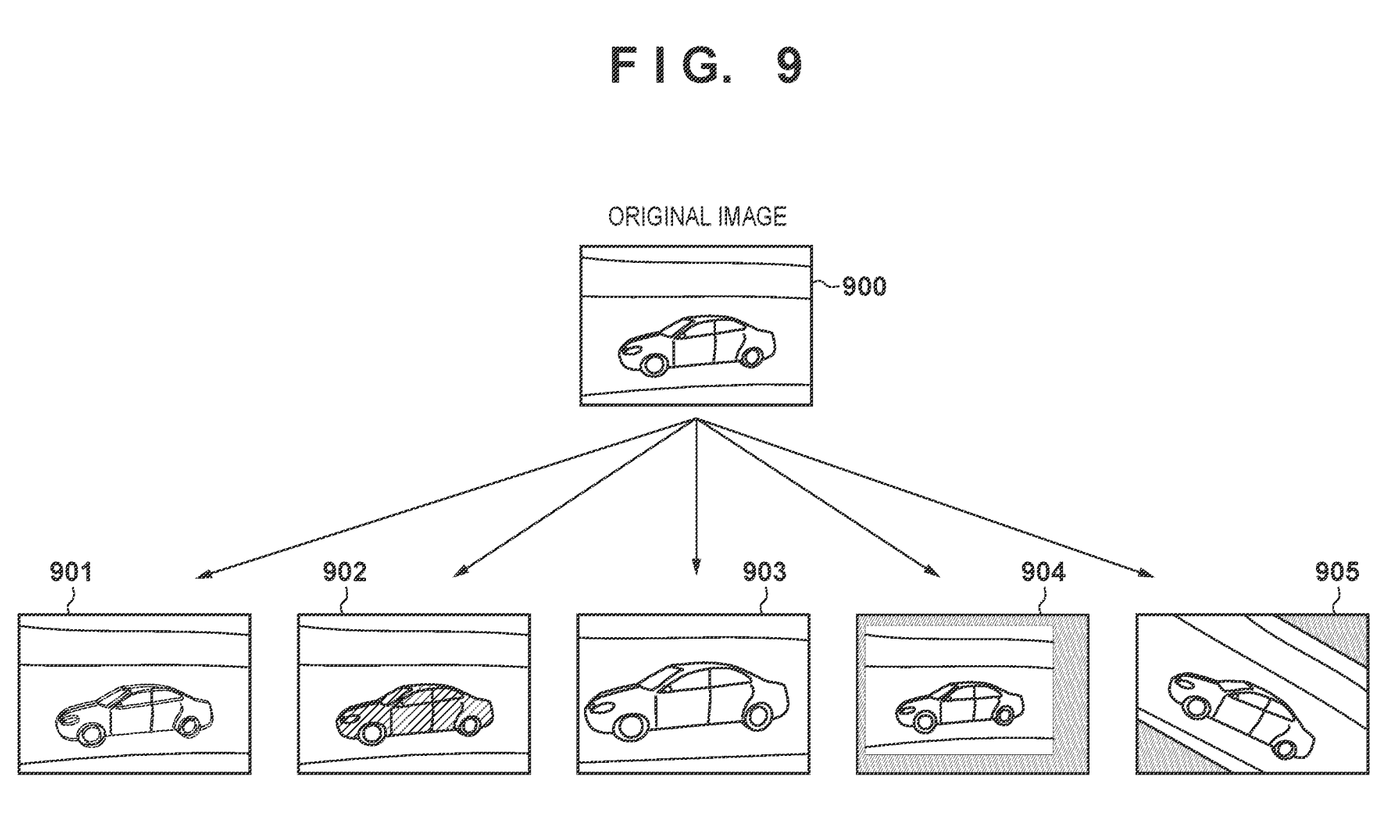
FIG. 9 is a diagram showing an example of processing for generating new supervisory data according to one embodiment.

FIG. 9 shows an example of generation of new supervisory data through image processing.

An image 900 represents the LV image with the evaluation value that was judged to be equal to or larger than the threshold in step S803. Using the LV image 900 as an original image, images 901 to 904 are generated as new supervisory data. The image 901 is an image obtained by pseudo-addition of blur and shaking to a subject with use of such image processing as filter processing. The image 902 is an image obtained by converting the luminance and tones of the subject with use of such image processing as gamma conversion processing. The image 903 is an image obtained by enlarging the subject with use of such image processing as resize processing. The image 904 is an image obtained by reducing the subject with use of such image processing as resize processing. Note that the positions within the entirety of the image may be changed after the reduction. The image 905 is an image obtained by rotating the subject with use of such image processing as projective transformation processing. When reduction processing and rotation processing have been performed as in the cases of the image 904 and the image 905, arbitrary processing can be performed with respect to blank portions outside the region of the original image; for example, the blank portions may be filled with a background color that has been designated in advance.

Note that in performing image processing that accompanies the movement of the subject position and deformation, such as reduction, enlargement, and rotation, it is necessary to change position information of the subject inside the image at the same time. Also, while the present embodiment has been described using one example of processing for generating new supervisory data, it is also possible to generate an image including a subject that has been distorted with use of such image processing as distortion correction. Furthermore, it is permissible to adopt a configuration that generates an image by combining the aforementioned multiple sets of image processing, or a configuration that generates not only one image but also a plurality of images by changing processing.

After the new supervisory data has been generated in step S804, the control unit 120 ends processing, and proceeds to processing for designation of a rectangular region with respect to the next LV image. Once the present processing has been executed with respect to all LV images, the processing is ended.

In the present embodiment, processing is performed with the shot image storage unit 103, the supervisory data generation unit 106, the supervisory data storage unit 108, and the learning unit 109 arranged inside the image capturing apparatus 100. However, it is permissible to adopt a configuration in which a part or all of them are provided in the form of a cloud, and processing is performed on the cloud via a communication unit (not shown) inside the image capturing apparatus.

As described above, according to the present embodiment, new supervisory data is generated by selecting an image in which the appearance of resolution and gradation of a subject are left from among LV images based on shooting settings that are intended to leave the appearance of resolution and gradation, rather than from among LV images that were shot under shooting settings configured by the user. This makes it possible to provide an image capturing apparatus capable of generating high-quality supervisory data.

(Inference Function)

Finally, the inference function of the image capturing apparatus 100 will be described. This function is a function of assisting shooting by detecting a subject at the time of live-view shooting based on an inference model obtained by the aforementioned learning function.

The inference unit 111 obtains an LV image from the LV image storage unit 105, and performs inference (subject detection) based on the learned inference model stored in the inference model storage unit 110. As a result of the inference, a subject type and information of a rectangular region that contains and exactly fits a subject are obtained. This information is referred to as subject position information. Superimposing a subject frame on a live-view image displayed on the operation and display unit 107 with use of the subject position information enables the user to understand the situation in which the image capturing apparatus 100 is recognizing the subject. Furthermore, the image capturing unit 101*a*, 101*b* and the image processing unit 102 can also focus on the subject with use of the subject position information, and perform optimal image processing in accordance with the subject type.

The foregoing can realize an image capturing apparatus that automatically detects a subject, focuses on the subject, and performs optimal image processing.

Also, adopting a configuration that allows the user to select which type is to be detected among learned subject types, enables reactions only to a subject desired by the user in accordance with a shooting situation.

Furthermore, various embodiments of the present disclosure can be realized also by processing in which a program that realizes one or more functions of the aforementioned embodiment is provided to a system or an apparatus via a network or a storage medium, and a computer of this system or apparatus reads out and executes the program. The computer can include one or more processors or circuits, and include a network of a plurality of separate computers or a plurality of separate processors or circuits in order to read out and execute computer-executable instructions.

The processors or circuits can include a central processing unit (CPU), a microprocessor unit (MPU), a graphics processing unit (GPU), an application-specific integrated circuit (ASIC), and a field-programmable gate array (FPGA). Also, the processors or circuits can include a digital signal processor (DSP), a dataflow processor (DFP), or a neural processing unit (NPU).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments of the present disclosure have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-070562, filed Apr. 9, 2020 which is hereby incorporated by reference herein in its entirety.

What is claimed is:

1. An image capturing apparatus, comprising:
   a first image capturing device that captures first continuous images that are continuous time-serially;
   a second image capturing device that captures second continuous images that are continuous time-serially under a shooting setting different from a shooting setting of the first image capturing device; and
   at least one processor or circuit configured to function as:
      a calculation unit that calculates evaluation values respectively for the second continuous images,
      an image processing unit that applies image processing to an image which is included among the second continuous images and which has the evaluation value equal to or larger than a threshold, and
      a generation unit that generates supervisory data for machine learning with use of an image to which at least the image processing has been applied.

2. The image capturing apparatus according to claim 1, wherein the generation unit generates supervisory data for machine learning further with use of the first continuous images or a still image.

3. The image capturing apparatus according to claim 1, wherein the first continuous images are images that are displayed on a display device as live-view images.

4. The image capturing apparatus according to claim 1, wherein the second continuous images are images shot under a shooting setting that improves image quality compared to the first continuous images.

5. The image capturing apparatus according to claim 4, wherein the second continuous images are images that have been shot under a shooting setting that performs processing for at least one of increasing a depth of field, increasing a shutter speed, using a different exposure setting, and using a wider-angle shooting range, compared to a shooting setting for the first continuous images.

6. The image capturing apparatus according to claim 1, wherein the image processing unit applies, to the image with the evaluation value equal to or larger than the threshold, at least one of processing for adding blur or shaking, processing for converting tones, enlargement or reduction processing, and rotation processing.

7. The image capturing apparatus according to claim 1, wherein the generation unit does not use an image that differs from a neighboring image by an amount smaller than a predetermined amount in generating the supervisory data.

8. The image capturing apparatus according to claim 1, wherein the first continuous images and the second continuous images are achieved by one image capturing device that functions both as the first image capturing device and the second image capturing device with use of time division.

9. A method of controlling an image capturing apparatus comprising:

executing first image capture that captures first continuous images that are continuous time-serially;

executing second image capture that captures second continuous images that are continuous time-serially under a shooting setting different from a shooting setting of the first image capture;

calculating evaluation values respectively for the second continuous images;

applying image processing to an image which is included among the second continuous images and which has the evaluation value equal to or larger than a threshold; and generating supervisory data for machine learning with use of an image to which at least the image processing has been applied.

10. A non-transitory computer-readable storage medium that stores a program for causing a computer to execute each step of a method of controlling an image capturing apparatus, the method comprising:

executing first image capture that captures first continuous images that are continuous time-serially;

executing second image capture that captures second continuous images that are continuous time-serially under a shooting setting different from a shooting setting of the first image capture;

calculating evaluation values respectively for the second continuous images;

applying image processing to an image which is included among the second continuous images and which has the evaluation value equal to or larger than a threshold; and generating supervisory data for machine learning with use of an image to which at least the image processing has been applied.

* * * * *